(12) United States Patent
Osaki

(10) Patent No.: US 7,581,136 B2
(45) Date of Patent: Aug. 25, 2009

(54) METHOD AND APPARATUS FOR DATA RECOVERY

(75) Inventor: Nobuyuki Osaki, Saratoga, CA (US)

(73) Assignee: Hitachi, Ltd., Tokyo (JP)

( * ) Notice: Subject to any disclaimer, the term of this patent is extended or adjusted under 35 U.S.C. 154(b) by 642 days.

(21) Appl. No.: 11/436,677

(22) Filed: May 19, 2006

(65) Prior Publication Data

US 2007/0271422 A1 Nov. 22, 2007

(51) Int. Cl.
*G06F 11/00* (2006.01)
(52) U.S. Cl. ...................................................... 714/20
(58) Field of Classification Search ................. 714/2–8, 714/13–16, 18–21, 37, 38, 42, 45, 47
See application file for complete search history.

(56) References Cited

U.S. PATENT DOCUMENTS

| | | | | |
|---|---|---|---|---|
| 6,745,285 | B2* | 6/2004 | Howard et al. ............... | 711/114 |
| 6,751,750 | B1* | 6/2004 | Humlicek ..................... | 714/20 |
| 7,305,584 | B2* | 12/2007 | Eguchi et al. ................. | 714/15 |
| 2004/0193820 | A1* | 9/2004 | Meiri et al. ................... | 711/167 |
| 2005/0015416 | A1 | 1/2005 | Yamagami | |
| 2005/0022213 | A1 | 1/2005 | Yamagami | |
| 2005/0028022 | A1 | 2/2005 | Amano | |
| 2005/0050286 | A1* | 3/2005 | Crowley et al. .............. | 711/162 |
| 2005/0283838 | A1* | 12/2005 | Saito ............................. | 726/24 |
| 2006/0069865 | A1* | 3/2006 | Kawamura et al. .......... | 711/114 |
| 2006/0149798 | A1* | 7/2006 | Yamagami .................... | 707/204 |
| 2006/0184728 | A1* | 8/2006 | Yamagami .................... | 711/111 |
| 2007/0226191 | A1* | 9/2007 | Ha et al. ........................ | 707/3 |

OTHER PUBLICATIONS

"An overview of today's Continuous Data Protection (CDP) solutions", CDP Buyer's Guide, 1st Ed., Jul. 2005, 7 pages.
Lonvick, C., "RFC 3164—The BDS syslog Protocol", The Internet Society, Aug. 2001, pp. 1-29.
New, D., "RFC 3195—Reliable Delivery for syslog", The Internet Society, Nov. 2001, pp. 1-36.

* cited by examiner

*Primary Examiner*—Nadeem Iqbal
(74) *Attorney, Agent, or Firm*—Mattingly & Malur, P.C.

(57) ABSTRACT

A storage system stores I/O operations in a journal volume in a chronological order and with assigned sequence numbers. When a predefined command to be logged is received, the storage system transmits a log of the command to an external server with the information of a particular sequence number of the I/O operation that is influenced by the command. When a log entry is identified as necessitating data recovery, such as by being issued maliciously, the I/O operations with sequence numbers larger than the particular sequence number of the identified log entry are discarded. A log analysis module is located separately from the storage system on the external server, and is able to identify the particular sequence number of the I/O operation which is affected by the malicious command so that instructions may be sent to the storage system regarding the sequence numbers of the commands to be discarded.

20 Claims, 14 Drawing Sheets

| # | command |
|---|---|
| 1 | lun_security |
| 2 | set_worm |
| 3 | format |
| 4 | ........ |

| # | Log server |
|---|---|
| 1 | Hoge1:514 |
| 2 | Hoge2:514 |

| Sequence Number | Vol # | Address | Data to be written |
|---|---|---|---|
| 010001 | 108 | 0001 | ... |
| 010002 | 108 | 0005 | ... |
| 010003 | 108 | 0001 | ... |
| 010004 | 108 | 0005 | ... |
| 010005 | 108 | 0003 | ... |

| | 501 | 502 | 503 | 504 |
|---|---|---|---|---|
| Sep 22 12:34:56 user1 lun_security SYSID=101 Server=110 HBA=121 Port=109 LUN=108 JNLSeq=010002 | | | | |
| Sep 22 12:34:57 user1 lun_security SYSID=101 Successful | | | | |
| Sep 22 12:34:58 user2 format SYSID=101 Port=109 LUN=108 JNLSeq=010006 | | | | |
| Sep 22 12:34:59 user3 format SYSID=101 Successful | | | | |
| ........ | | | | |

| 701 | 702 | 703 | 704 |
|---|---|---|---|
| Sep 22 12:34:56 user1 lun_security SYSID=101 Server=601 HBA=621 Port=109 LUN=108 JNLSeq=010002 | | | |
| Sep 22 12:34:57 user1 lun_security SYSID=101 Successful | | | |
| Sep 22 12:34:58 user2 format SYSID=101 Port=109 LUN=108 JNLSeq=010004 | | | |
| Sep 22 12:34:59 user3 format SYSID=101 Successful | | | |
| ........ | | | |

FIG. 7

METHOD AND APPARATUS FOR DATA RECOVERY

BACKGROUND OF THE INVENTION

1. Field of the Invention

The present invention relates generally to storage systems, and, more particularly, to data protection and recovery in storage systems.

2. Description of Related Art

In storage systems, there is always a threat that hackers, disgruntled employees, or other unforeseen circumstances might destroy data. In order to prevent such a threat, some storage systems keep a log of every important operation using, for example, a mechanism called syslog or IDS (intrusion detection system) for the purpose of identifying malicious attacks. The syslog protocol has been used for the transmission of event notification messages across networks for many years. Under the syslog protocol, event messages and alerts may be transmitted across a network by a sending device to a collecting device, such as at the start or end of a process, or to report the current status of a process. A syslog server is a daemon that is set up on a computer to receive syslog messages from hosts and other syslog-enabled devices. (See, e.g., Lonvick, C., "RFC 3164—The BSD Syslog Protocol", The Internet Society, August 2001.) However, while the use of logging with a syslog server can enable a user to identify attacks, the downside of these methods is that an attack is not found until after the attack is made.

There is also a technology known as "continuous data protection" (CDP), in which a storage system continuously captures or tracks every data modification. Under CDP technology, the data is backed up whenever any change is made to the data. Continuous data protection is different than traditional backup in that it is not necessary for a user to specify a point in time at which the user would like to recover data until the user is actually ready to perform a restore operation. Traditional data backup systems are only able to restore data to certain discrete points in time at which backups were made, such as one hour, one day, one week, etc. However, with continuous data protection, there are no backup schedules. If the storage system becomes contaminated with a virus, or if a file in the system is corrupted or accidentally deleted, and the problem is not discovered until some time later, a user is still able to recover the most recent uncorrupted version of the file. Further, a CDP system set up on a disk array storage system enables data recovery in a matter of seconds, which is considerably less time than is possible with tape backups or archives.

Thus, the basic purpose of CDP is to enable recovery of data at any desired or essential point in time when it becomes necessary for data to be recovered. In effect, CDP creates a continuous journal of complete storage snapshots, i.e., one storage snapshot for every instant in time that a data modification occurs. In the CDP method, storage systems, backup software in host computers, or other hardware or software captures write I/O operations from host computer file systems and records all of the write I/Os as a database journal. Also when CDP is started, the system initially preserves a snapshot copy of the production data volumes (i.e., the volumes for which the users want to have the data backed up), which is the initial image of the volumes when CDP is started. When recovering data, by applying the journal against the initial image of the volumes, CDP enables recovery of data at any point when write I/Os were made to the primary volumes.

U.S. Patent Application Publication Nos. 2005/0015416 to Kenji Yamagami, 2005/0028022 to Takashi Amano, and 2005/022213 to Kenji Yamagami, the disclosures of which are incorporated herein by reference in their entireties, disclose CDP journaling techniques for fast data recovery. These references include a discussion of two journal entry types, an "AFTER" journal entry and a "BEFORE" journal entry, that are maintained for enabling recovery of data in a production data volume, should recovery be necessary. When a write request from a host computer arrives at a storage system, a journal entry is generated in response. The journal entry comprises a journal header and journal data. The journal header contains information about its corresponding journal data. The journal data comprises the data (write data) that is the subject of the write operation. This kind of journal is referred to as an "AFTER journal", since it is what the data will look like "after" the write operation is implemented. A BEFORE journal contains the original data of the area in storage that is the target of a write operation. A BEFORE journal entry therefore represents the contents "before" the write operation is performed. A BEFORE journal is created by copying original data of the area of storage that is the target of a write operation before the write operation is performed. This enables data recovery by applying data back from the BEFORE journal to a production data volume.

However, when data in a storage system is destroyed or corrupted, and the user desires to roll back the data to before the attack or other incident, it is sometimes difficult for the user to identify the particular time to which to roll the data back. For example, a log analysis module is typically unable to determine the exact timing when an event necessitating data roll back may have occurred. In such a case, the system may end up deleting too many I/O operations which otherwise would not need to be deleted. Thus, under conventional means, a human operator has to go through and check each I/O operation precisely to identify whether the I/O operation was received before the incident or after the incident, which is very laborious task.

BRIEF SUMMARY OF THE INVENTION

A storage system stores I/O operations such as write operations or other I/O operations that modify the stored data (hereafter "write operations") chronologically with sequence numbers. When a command which is predefined to be logged is received, the storage system captures a log of the command and transmits it to an external server with the information of the sequence number of the write operation that is influenced by the command. When the log entry is identified as being one that necessitates data roll back, such as being issued by a malicious person or otherwise harmful to the existing data, the write operations having sequence numbers equal to or larger than the sequence number included in the identified log entry are discarded.

These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 2 illustrates an example of a command table that contains commands which are required to be logged by the storage controller.

FIG. 3 illustrates a log configuration table.

FIG. 4 illustrates a journal data structure representing data stored in the journal volume.

FIG. 5A illustrates a portion of a log showing examples of log entries.

FIG. 7 illustrates a portion of a log having log entries including a malicious entry.

DETAILED DESCRIPTION OF THE INVENTION

Figure 1:
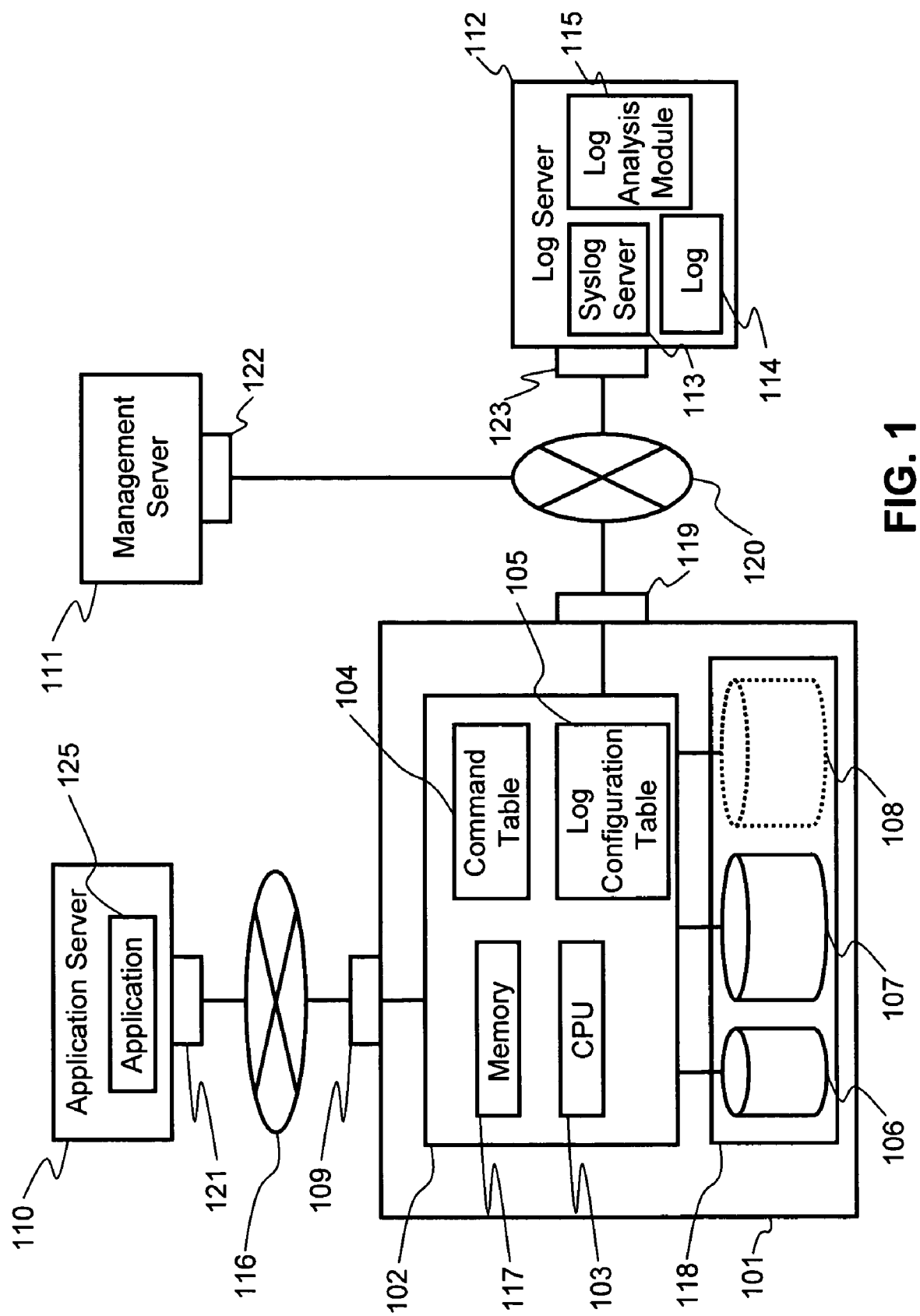
FIG. 1 illustrates an example of a system in which the method and apparatus of this invention may be applied.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

System Configuration

FIG. 1 illustrates an example of a system in which the method and apparatus of this invention can be applied. The system is composed of a storage system 101 having a first network interface 109 for placing storage system 101 into communication with a first network 116. Storage system 101 includes a storage controller 102 having a CPU 103, a memory 117, and storage devices 118. Storage devices 118 are one or more hard disk drives in the preferred embodiment, but in some embodiments, may be solid state memory, optical storage devices, or the like.

A command table 104 is stored by storage system 101, and contains a list of commands that are required to be logged, as will be described in greater detail below. Further, log configuration table 105 stored on storage system 101 contains configuration information for logging, such as a server name which receives logs via syslog protocol, and the like. One or more logical or virtual volumes may be created on storage devices 118. The present embodiment includes a journal volume 106, a data volume 107, and a virtual volume 108, which will be described in greater detail below.

Storage system 101 is able to communicate with an application server 110 via network 116. Application server 110 is able to issue I/O commands to the storage system 101. Application server 110 includes a network interface 121 to enable application server 110 to communicate with network 116, and thereby communicate with storage system 101. Further one or more applications 125 may be active on application server 110 for accessing storage system 101 and conducting I/O operations thereon, such as read and write operations. Additionally, while only one application server 110 is illustrated, it should be understood that any number of application servers 110 may be in communication with storage system 101.

Storage system 101 further includes a second network interface 119 to enable storage system 101 to communicate with a second network 120. A management server 111 includes a network interface 122, and is in communication with storage system 101 via network 120. Management server 111 may be used for carrying out management functions with respect to storage system 101, and for sending management instructions to storage system 101. Also in communication with second network 120, via a network interface 123, is a log server 112 running a syslog server 113 or similar program to which the storage system 101 transmits log information. Under the syslog protocol, event messages and alerts may be transmitted across a network by a sending device to a collecting device. Thus, the sending device in the present invention is the storage system 101, which transmits log entries to the syslog server 113 on log server 112, which acts as the collector. The log entries are stored in one or more log files or logs 114 which are stored by log server 112. A log analysis module 115 is included for execution by log server 112 for performing analysis of log entries to detect malicious, undesirable, or otherwise harmful activity that would necessitate data roll back and recovery.

Servers 110, 111, 112 may be conventional computer systems of the PC type having a CPU, memory, and local storage, as is known in the art. In the embodiment illustrated, first network 116 is a Fibre Channel based storage area network (SAN), while second network 120 is an Ethernet based local area network (LAN). Under this arrangement, network interface 121 for application server 110 is a host bus adapter (HBA), while network interface 109 of storage system 101 is a port. Further, other network protocols, such as SCSI, Internet Protocol and the like, may be used for either network 116, 120. Still alternatively, first network 116 and second network 120 may comprise a single network through which application server 110, management server 111, log server 112, and storage system 101 are all able to communicate.

Journaling of Write Operations

Volume 108 is a virtual volume visible to application server 110, while journal volume 106 and data volume 107 are not visible in normal operations. Virtual volume 108 appears as the volume that application server is storing data to or reading data from, when, according to the invention, the data is actually being stored to data volume 107 or journal volume 106. Thus, virtual volume 108 is not an actual logical volume that has been allocated storage space on storage system 101, but instead is merely presented to application server 110 by controller 102 as a unitary volume where the data is stored.

Additionally, under the invention, data volume 107 contains production data that is updated to a certain point in time, such as, for example, time "A". Since time "A", the write operations written to virtual volume 108 by the application server 110 are stored in the journal volume 106 according to sequentially assigned sequence numbers, and these write operations have not yet been updated to the data volume 107. Thus, when the application server 110 reads data stored at a specific address, such as a specified logical block address (LBA), and if there are entries with the same address in the journal volume 106, the entry with the largest sequence number is returned to the application server 110. If there is no entry with such an address in the journal volume 106, data located at the specified address in data volume 107 is returned.

FIG. 2 illustrates a command table 104 that contains a listing of commands 201-203 which, according to the invention, are required to be logged by the storage controller 102. The commands 201-203 illustrated in FIG. 2 are only exemplary, and other commands may also be required to be logged as well. The commands included in the command table would typically be management commands that affect access rights, security, or otherwise change the nature of the data volume 107 itself, such as deleting, formatting or reallocating the volume. However, potentially any command can be logged, and thus, the commands that are included in the command table 104 may depend on the particular environment in which the invention is implemented. Such commands may be issued by the management server 111 or any other server, such as the application server 110.

When the storage controller 102 receives a command included in the command table 104, the storage controller 102 generates a log entry and sends the log entry to the log server 112 which is specified in the log configuration table 105, as illustrated in FIG. 3. The log configuration table 105 includes entries, such as rows 301 and 302 which specify a log server name and port that receives log entries. When the storage controller 102 generates a log entry, the storage controller 102 adds the sequence number of the write operation that is affected by the command, such as the next write operation received following completion of processing of the command.

When the application server 110 writes data to a specific address of the virtual volume 108, the write data is stored in the journal volume 106 in a journal data structure 401 including an assigned sequence number 402, as shown in FIG. 4. Data structure 401 may further include the volume 403 to which the data is intended to be written, the address 404 to which the data will be stored, and the data itself 405. Thus, entries 406-410 illustrate exemplary journal entries that are arranged sequentially according to their assigned sequence number 402.

As will be described in greater detail below, the data in journal volume 106 is eventually applied to the data volume 107. Applying the journal data to data volume 107 means picking up journal entries in the journal volume 106 in the order of the sequence numbers, and writing each entry to the specified address of the volume 107, then optionally removing the applied journal entries from the journal volume 106.

FIG. 5A illustrates a portion of log 114 showing examples of log entries 501-504. For example, entry 501 is an entry which is generated when a "lun_security" command 201 is received by storage system 101. According to entry 501, on September 22nd at 12:34:56, the storage system 101 (SYSID=101) received the command "lun_security" which restricts the access to the volume specified with the port number 109 and LUN 108 to only enable access from the HBA 113 attached to the server 110. JNLSeq specifies the sequence number of the entry in the journal volume 106, which is first affected by the command "lun_security".

Figure 5B:
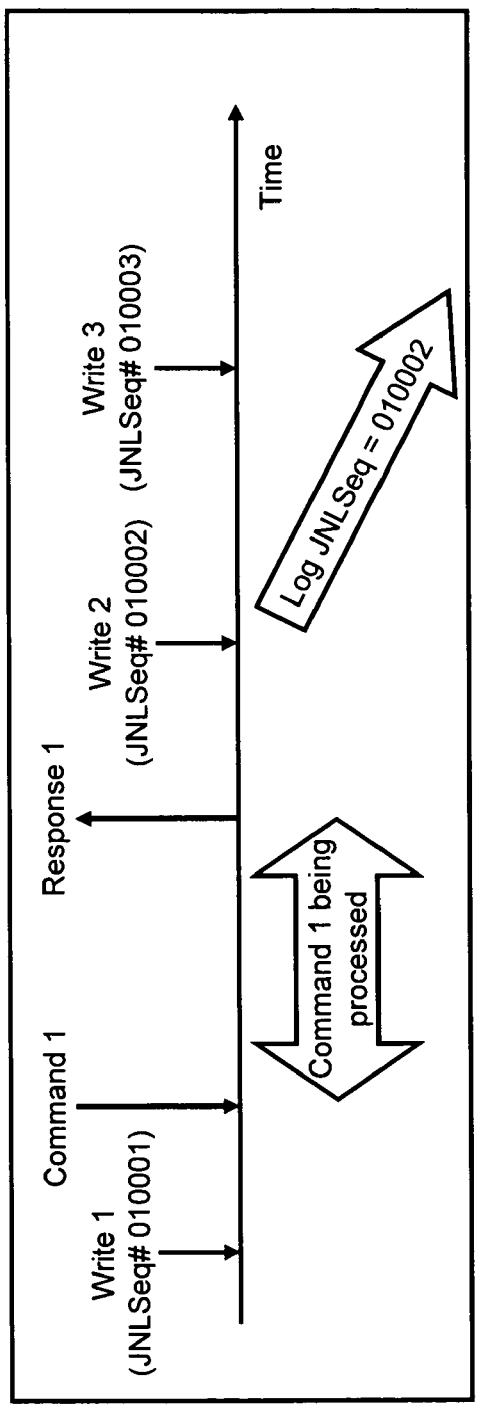
FIG. 5B illustrates a timeline for a first scenario under the invention in which a sequence number is assigned to a command.

For example, as illustrated in FIG. 5B, write 1, 2, 3 are write operations from application server 110. In a first scenario, a command 1 is issued to the storage system after a write operation with JNLSeq 010001, and the command processing finishes before receipt of a write operation with JNLSeq 010002. Because the storage system is able to determine that the sequence number of the next write operation after the completion of the command processing is 010002, this sequence number is assigned to the command, and the log entry carries this sequence number 010002 to the syslog server for entry in the log file. Thus, as illustrated in the log of FIG. 5A, if the command takes effect immediately after the command is received, and, say one second later, a write operation that is assigned the sequence number of 010002 is received from the application server to the volume 108, this sequence number is included in the log entry 501.

Figure 5C:
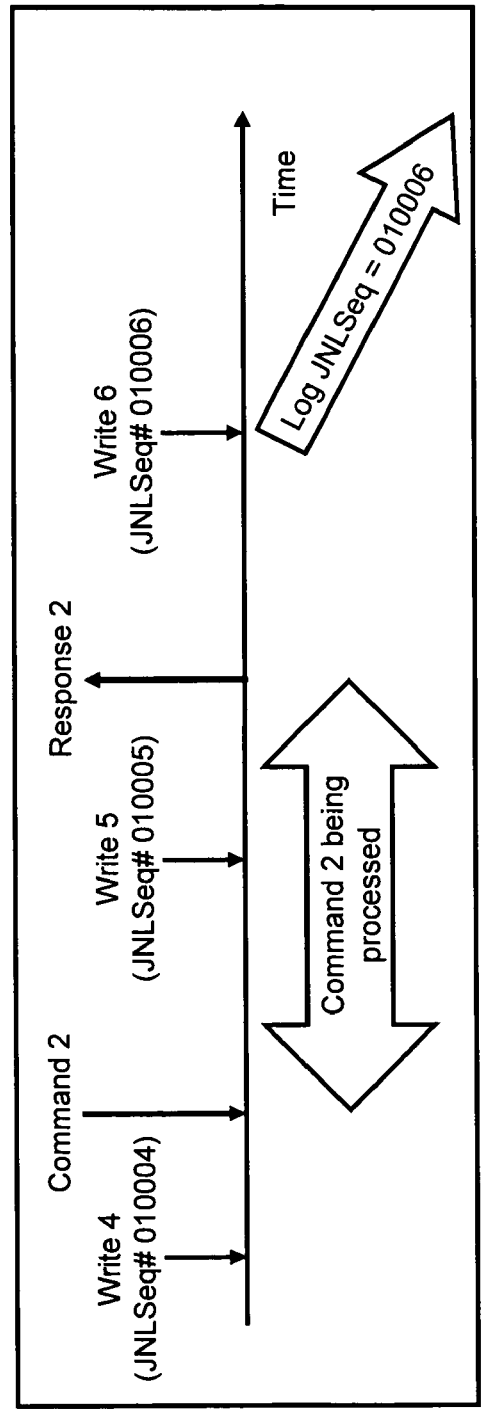
FIG. 5C illustrates a timeline for a second scenario under the invention in which a sequence number is assigned to a command.

In some situations a relatively long time may pass between when the command is received and when the command takes effect. For example, FIG. 5C illustrates a second scenario in which the command processing takes longer. In this case, command 2 is received after write 4 having a sequence number of 010004. While command 2 is being processed, write 5 is received and is assigned sequence number 010005. After processing of command 2 is completed, write 6 is received and assigned sequence number 010006. Thus, the log entry for command 2 is assigned sequence number 010006, and because the write operations are so frequent, the sequence number contained in the log entry is not necessarily that of the next write operation of the command, but instead, is assigned after the processing of the command is completed.

Furthermore, in such a case, the log entry for the command may be either transmitted after the command process completes, or may be transmitted twice, i.e., once just after the command is received, and again after the command is processed successfully. In the latter case, the first log entry does not need to a have sequence number (JNLSeq) because it may not be possible to determine the sequence number of the write operation that comes into the storage controller for the first time after processing of the command takes effect. The first write operation after the specific command takes effect can be identified as the next write operation received when the command takes effect, e.g. in some cases when the command processing is completed.

Accordingly, if a command log entry is identified by the log analysis module as a specific event caused by an intrusion, the data before the attack cannot be recovered if there is no sequence number. For example, if the first log entry does not have the sequence number and a second entry with the sequence number has been sent to the log server later, then when the log analysis module identifies an entry that is caused by a malicious attack but the entry does not have a sequence number, the log analysis module or a human operator can look for the second entry which points to the same event and that also includes the sequence number of a write operation that occurred following completion of processing of the command. Then the data before the attack can be recovered using the technique discussed above. Additionally, when the entry does not contain the sequence number information, it is helpful if the entry indicates that a second entry will appear with the sequence number info. For example, "JNLSeq=AppearLater" at the end of the entry may be used to indicate that meaning. Further, it should be noted that the log file may contain events from other devices which do not use the technique described in this invention, and the log file may have other purposes in addition to the invention, as is known in the art.

The syslog server 113 receives and stores log entries transferred from the storage system 101. Entries 501 through 504 are examples of such log entries stored in the log file 114. The log analysis module 115, for example, periodically checks the log file 114 to see if there has been any intrusion from outside, an attack on the storage system 101, or other command that is malicious or necessitates recovery of data. Alternatively, log analysis module 115 can begin checking the log entries immediately, as they are received, such as through receiving notification from syslog server 113.

Process Flows

Figure 6:
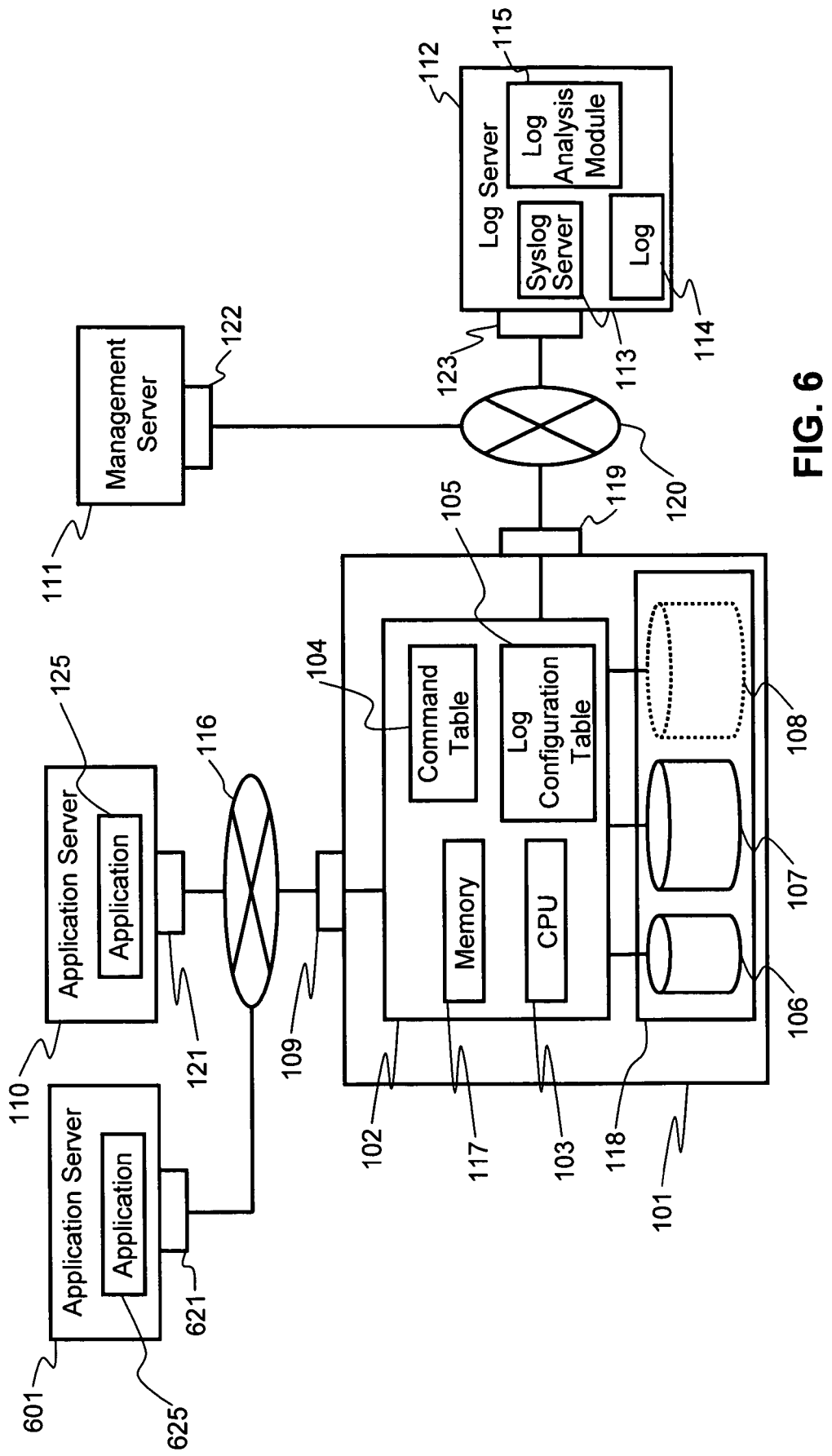
FIG. 6 illustrates an example of how the present invention functions in a system such as that described above with reference to FIG. 1.

FIG. 6 illustrates an example of how the present invention functions in a system, such as that described above with reference to FIG. 1. A second application server 601 having a second application 625 and a network interface 621 is able to communicate with storage system 101 via network 116 in the system described above with reference to FIG. 1. Assuming a malicious person who is working on application server 601 wants to obtain access to the virtual volume 108, the malicious person may somehow succeed in inputting a lun_security command and gaining access to volume 108.

As illustrated in FIG. 7, a portion of log 114 may include entries 701-704. Entry 701 might be a typical log entry for a malicious "lun_security" command used for gaining access to volume 108. After some time, the log analysis module 115 may determine that the entry 701 is evidence that the LUN security is wrongly configured. In such a case, the write operations received after this command in volume 108 can not be considered to be reliable or data might have been corrupted, deleted, etc., on the volume 108.

One solution under a first embodiment of the invention, is to discard all of the write operations that took place after the command that created log entry 701. To do so, the log analysis module 115 or other module issues an instruction to the controller 102 to discard the journal entries from journal volume 106 with sequence numbers equal to or larger than the sequence number in log entry 701, which in this case is sequence number "010002". Thus, the journal volume 106 at this time contains the data that will be contained in the data volume 107 after the data in the journal volume 106 is applied to the data volume 107. The journal volume 106 in this embodiment may be described as an "AFTER journal" because it contains the configuration of the data that will exist after the command is implemented. However, the data in journal volume 106 is not applied to the data volume 107 under the invention until after log analysis module 115 on server 112 has performed a data protection analysis by analyzing the contents of log 114.

Figure 8A:
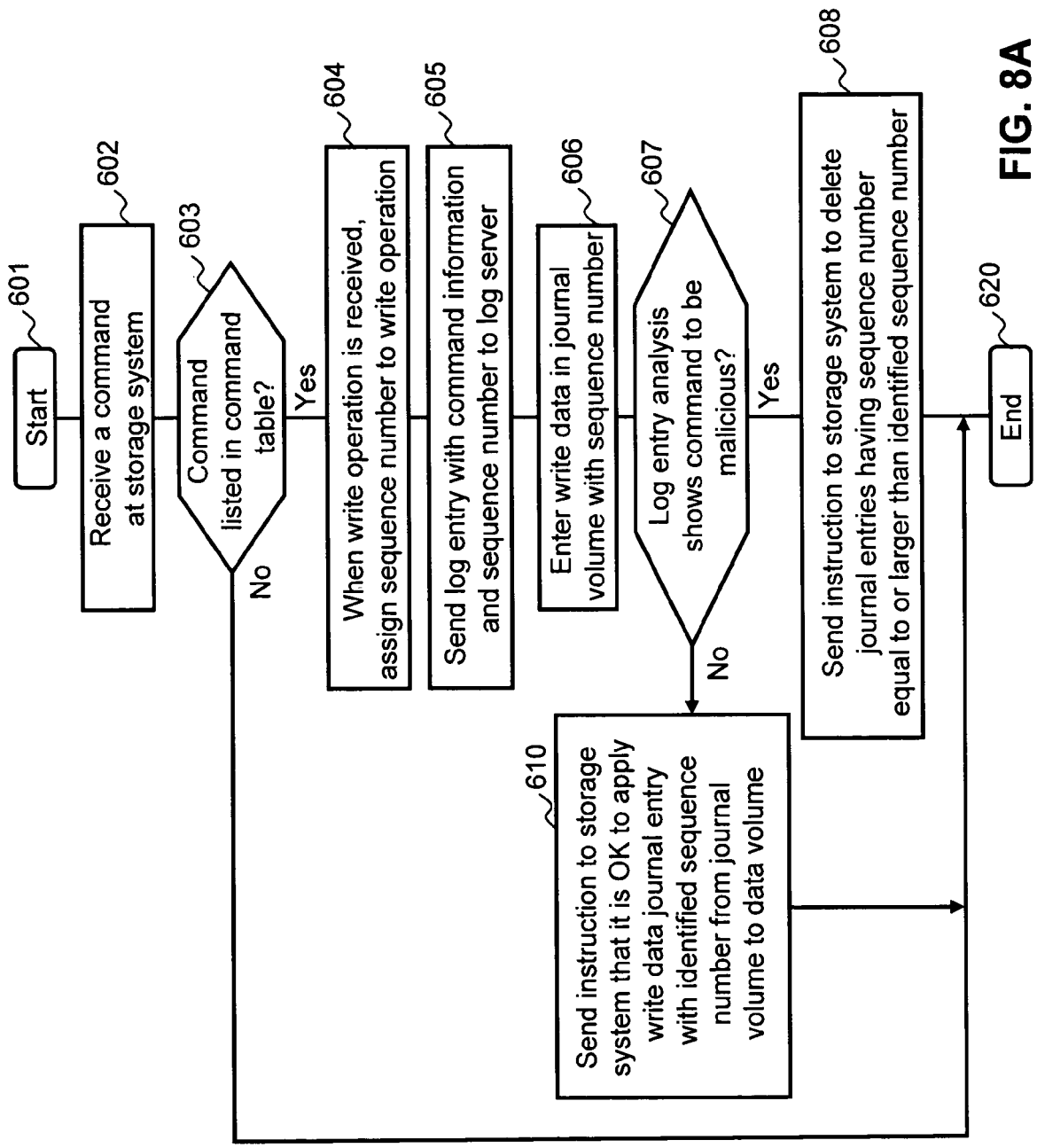
FIG. 8A illustrates a process flow for a one embodiment of the invention.

FIG. 8A illustrates a process flow for the first embodiment of the invention that incorporates an "AFTER journal" in journal volume 107. The process of FIG. 8A includes the following steps:

Step 601: The process starts with the storage system 101 able to communicate with networks 116, 120 and receive commands and write operations.

Step 602: The storage system receives a command.

Step 603: The storage system compares the command with the commands listed in the command table 104. If the command is listed in the command table, then the process proceeds to step 604. If the command is not listed in the command table, then the command should be safe to apply and the process proceeds to step 620 and ends.

Step 604: When a write operation is received, a sequence number is assigned to the write operation.

Step 605: A log entry is created including the sequence number and the details of the command. The log entry is sent to syslog server 113 on log server 112 and stored in log 114.

Step 606: The write data is stored in journal volume 106 as a sequential journal entry, as illustrated in FIG. 4, along with the sequence number assigned to the write data.

Step 607: Log analysis module 115 on log server 112 examines the log entries in log 114 and determines whether any of the log entries are malicious or would otherwise make it necessary to recover data. Log analysis module 115 may begin the examination of log 114 as soon as the log entries are received, such as upon notification from syslog server 113. Alternatively, log analysis module may be activated periodically to examine log 114. When a log entry deemed to originate from a malicious command is located, the process proceeds to step 608. On the other hand, if none of the log entries are deemed malicious or destructive of data, the process goes to step 610.

Step 608: When a malicious command (or a command that requires data to be rolled back), has been identified, any write data associated with that command, and any write data received subsequently should be deleted. Accordingly, the log server sends an instruction to the storage system 101 to delete from the journal volume 106 all journal entries starting with the identified sequence number of the malicious command and all subsequent journal entries. The storage system deletes these journal entries and the process proceeds to step 620 to end.

Step 610: When no malicious commands are located in the log 114, this means that it is safe to apply the data from the journal volume 106 to the data volume 107. Accordingly, the log server 112 may send an instruction to storage system 101 to inform the storage system 101 that it is allowable to apply to the data volume 107 the journal entries in journal volume 106 that have been entered subsequently to all commands that have been analyzed and determined not to be malicious, and the process proceeds to step 620 to end.

In a second embodiment, a "BEFORE journal" may be maintained on journal volume 106 instead of an AFTER journal. In such case, before data volume 107 is modified by a write operation, the data to be overwritten is copied to journal volume 106 as a BEFORE journal entry. Sequence numbers are assigned to each journal entry in journal 106 and included in each log entry in log 114 as well on log server 112. Thus, each sequence number is that of the journal record which is replaced by the data block conveyed by a write operation which is affected by one of the commands predefined in the table 104. Thus, the data in data volume 107 is updated as write operations are received and applied, and log analysis module 115 then determines whether a malicious or otherwise improper command has been implemented. When the log analysis module 115 identifies a malicious command or other command necessitating the roll back of data, the module 115 may issue an instruction to storage controller 102 to recover the state of data to just before the sequence number of the command identified as being malicious. Upon receiving this instruction, controller 102 applies all of the journal records having sequence numbers equal to or larger than the sequence number of the command identified by the analysis module 115 as being malicious. By applying the copied data of journal volume 106 back to data volume 107, the effects of the malicious command and any commands or write operations issued after the malicious command are eliminated.

Figure 8B:
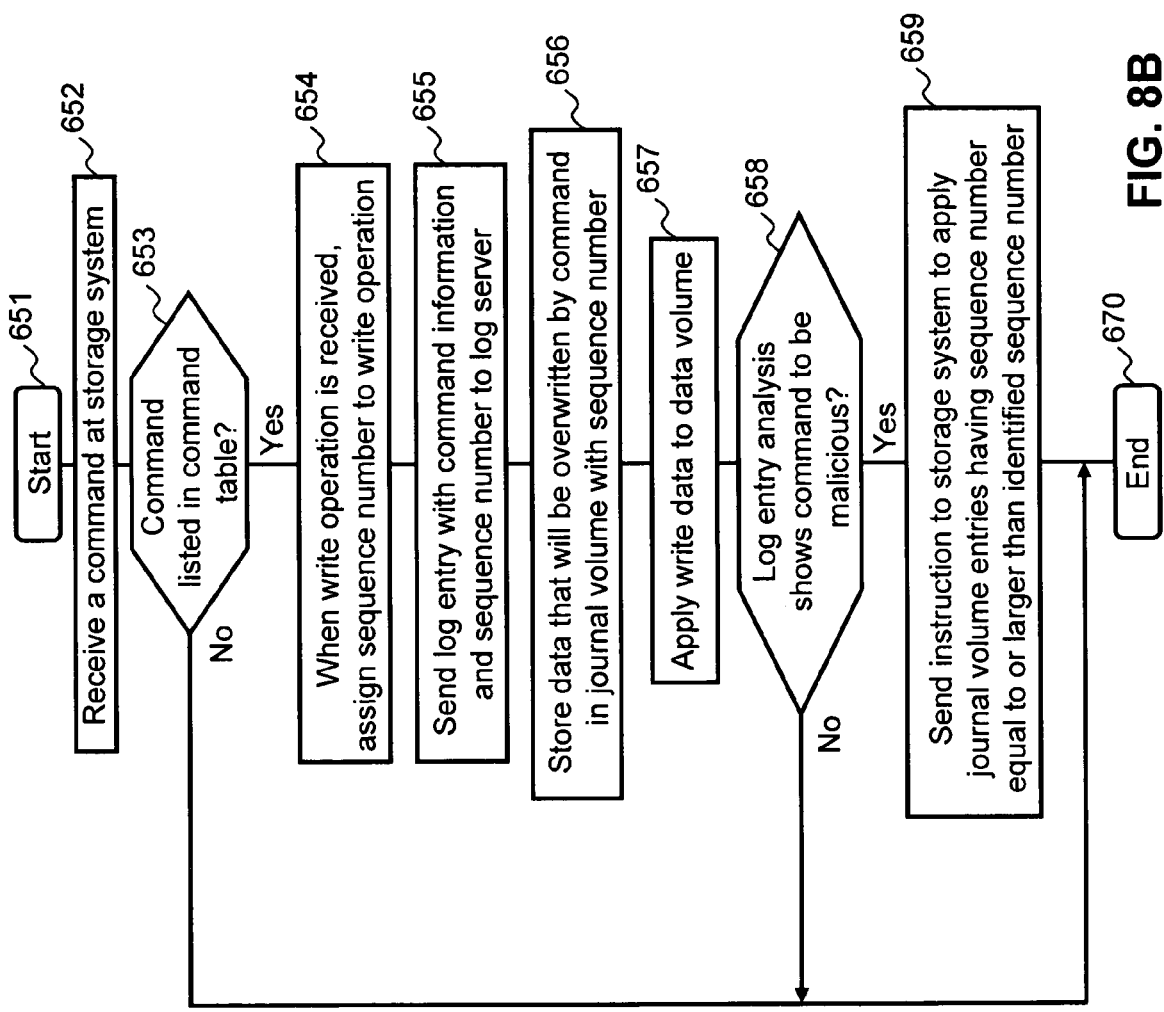
FIG. 8B illustrates a process flow for a second embodiment of the invention.

FIG. 8B illustrates a process flow for the second embodiment that incorporates a BEFORE journal as the journal volume 106, and includes the following steps:

Step 651: The process starts with the storage system able to communicate with networks 116, 120, and receive commands and write operations.

Step 652: The storage system receives a command.

Step 653: The storage system compares the command with the commands listed in the command table 104. If the command is listed in the command table, then the process proceeds to step 655. If the command is not listed in the command table, then the command should be safe to apply and the process proceeds to step 670 to end.

Step 654: When a write operation is received, a sequence number is assigned to the write operation.

Step 655: A log entry is created including the sequence number assigned by the storage system and the details of the command. The log entry is sent to syslog server 113 on log server 112 and stored in log 114.

Step 656: Any preexisting data in data volume 107 that would be overwritten by the write data is copied to journal volume 106 as a sequential journal entry, as illustrated in FIG. 4, and the sequence number assigned to the write operation is stored with the journal entry.

Step 657: The write data is then applied to data volume 107.

Step 658: Log analysis module 115 on log server 112 examines the log entries in log 114 and determines whether any of the log entries are malicious. Log analysis module 115 may begin the examination of log 114 as soon as the log entries are received, such as upon notification from syslog server 113. Alternatively, log analysis module may be activated periodically to examine log 114. When a log entry deemed to originate from a malicious command is located, the process proceeds to step 659. On the other hand, if none of the log entries are deemed malicious, the process goes to step 670 to end. In such a case, the log server 112 may send an instruction to the storage system 101 to inform the storage system 101 that it is allowable to delete the BEFORE journal entry.

Step 659: When a malicious command has been identified any write data associated with that command or received after that command should be deleted. Accordingly, the log server 112 sends an instruction to the storage system 101 to apply back to data volume 107 from the journal volume 106 all journal entries starting with the identified sequence number of the malicious command and all subsequent sequence numbers. The storage system applies these journal entries back to data volume 107, thereby restoring the volume to its state before the malicious command, and the process proceeds to step 670 to end.

The recovery command issued by the log server 112 when a malicious command is located may be a general command that instructs the storage controller 102 to recover data in data volume 107 to the state that existed just before a specific sequence number, so that the command may be applicable to a storage system that maintains either a BEFORE journal or an AFTER journal. Alternatively, the recovery command may explicitly specify how to recover the data, as described above (i.e., in the case of an AFTER journal to delete from the journal volume 106 all journal entries having a sequence number equal to or larger than the sequence number identified by the analysis module 115, or in the case of a BEFORE journal to apply to the data volume 107 all of the journal records with sequence numbers equal to or larger that the specified sequence number).

Figure 9:
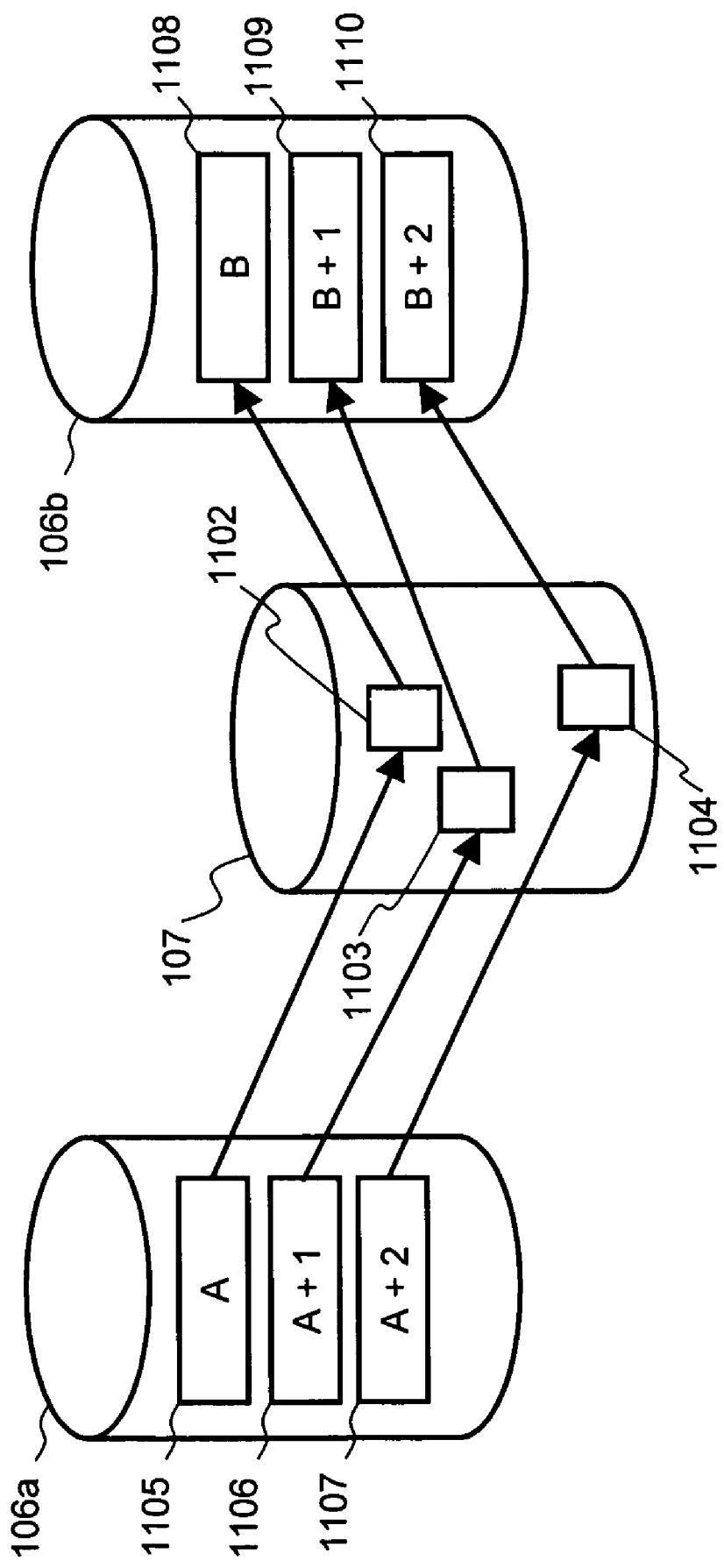
FIG. 9 illustrates how the AFTER journal is converted to the BEFORE journal.

In a third embodiment, both an AFTER journal and a BEFORE journal are maintained in the same storage system. The AFTER journal and the BEFORE journal may be maintained in the same journal volume, but preferably, as illustrated in FIG. 9, may be maintained in a first journal volume 106a and a second journal volume 106b, respectively. In this arrangement, when the data from the AFTER journal volume 106a is to be applied to the data volume 107, a BEFORE journal entry is first generated. FIG. 9 depicts the way the AFTER journal is converted to the BEFORE journal. Data volume 107 includes data blocks 1102, 1103 and 1104. Each data block 1102-1104 has a journal record 1105-1107, respectively, located in the AFTER journal. "A", "A+1", and "A+2" are the sequence numbers assigned to those AFTER journal entries 1105-1107, respectively.

When the data from the AFTER journal is applied to the data volume 107, the BEFORE journal is generated. For example, when the entry 1105 is to be written on the data block 1102, the data previously stored on the data block 1102 is stored as 1108. In the same way, when the entries 1106 and 1107 are applied on the volume 1101, the previously-stored data from blocks 1103 and 1104 are stored as journal entries 1109 and 1110, respectively.

Additionally, suppose, for example, that the sequence number of 1108 is "B", the sequence numbers of 1109 and 1110 become "B+1" and "B+2" respectively. "B" may be different value from "A" in case the sequence numbers are re-assigned in one of the journals, but it is preferred that the sequence numbers are the same in order to avoid complexity. Thus, if "B" is equal to "A", the analysis module 115 can issue an instruction to recover the data to a state before "A". However, if "B" is different from "A", i.e., the sequence numbers have been re-assigned, the storage controller 102 should allow the analysis module 115 to use the sequence numbers before the re-assignment and convert the numbers internally. The advantage of this particular arrangement, having both an AFTER journal and a BEFORE journal is to enable the recovery of data even after the AFTER journal has been applied to the data volume 107. Thus, if log analysis module 115 should fail to recognize a malicious command from analysis of the log 114, data may still be recovered from the BEFORE journal.

Figure 8C:
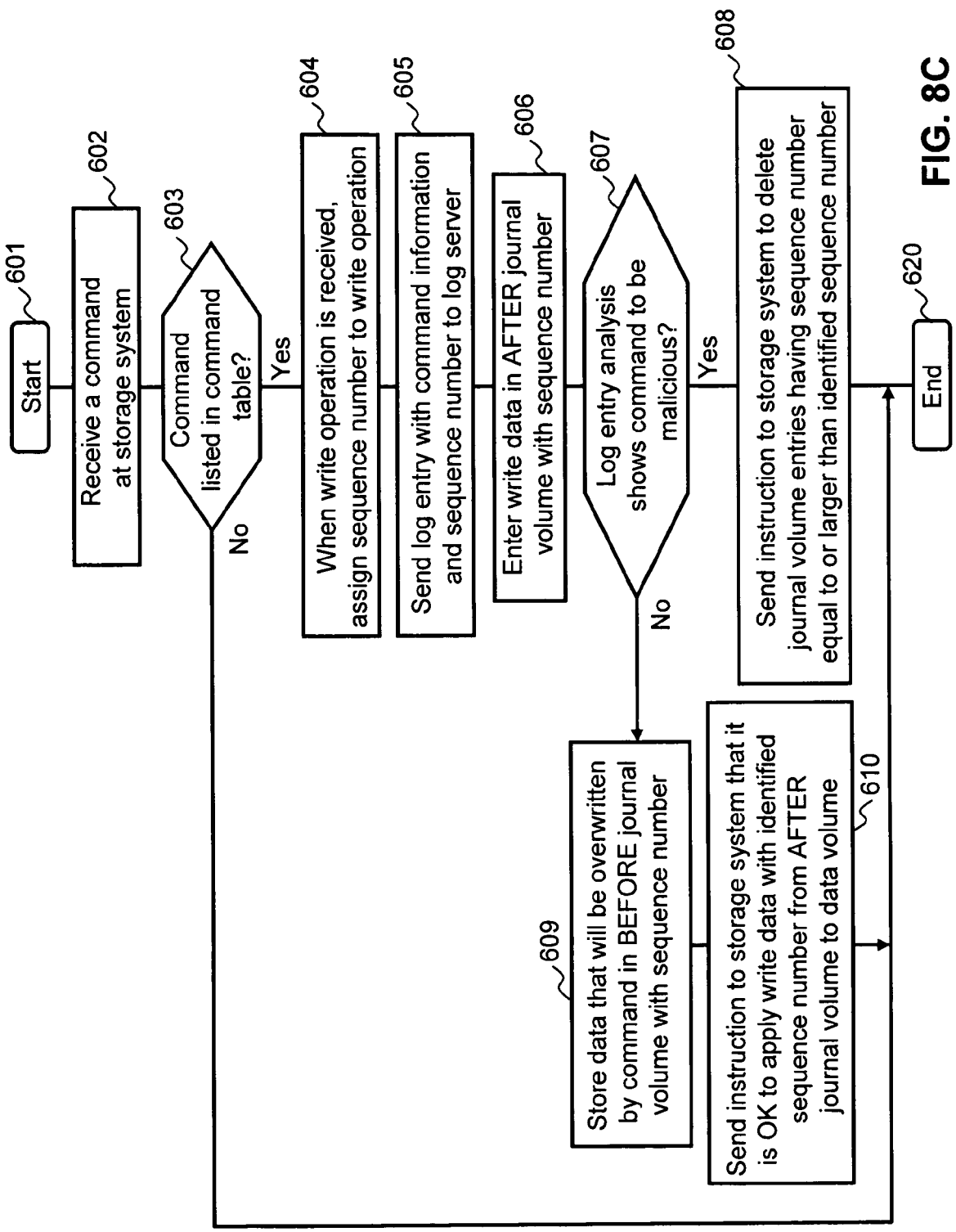
FIG. 8C illustrates a process flow for a third embodiment of the invention.

FIG. 8C illustrates a process flow for the present invention when both an AFTER journal and a BEFORE journal are maintained. The process set forth in FIG. 8C includes steps 601-608, 610 and 620, which are essentially the same as those described above for FIG. 8A, and accordingly, will not be described again here in detail. However, it is noted that in step 606, the write data is entered into the AFTER journal with the sequence number.

FIG. 8C also includes an additional step 609 not included in FIG. 8A. In particular, additional step 609 is located between steps 607 and 610. Under step 609, when no malicious commands have been located, and similar to step 656 in FIG. 8B, preexisting data that will be overwritten as a result of the write operation is stored to the BEFORE journal on journal volume 106b according to the sequence number for the write operation. Following this, in step 610, the write data stored as a journal entry in the AFTER journal is applied to data volume 107, and the process ends at step 620.

In the case of identification of a malicious attack or other command that necessitates data to be rolled back, the storage system 101 may provide an interface to discard write operations made to a specific volume having a sequence number equal to or larger than a specific sequence number. Under the invention, log analysis is performed outside the component (controller 102) which generates events to be logged. Further, because log analysis module 115 is located in an external computer (log server 112) because the log entries have sequence numbers associated with logged commands, analysis module 115 is able to determine the point in time when the event occurred, and will not end up deleting too many write operations which otherwise do not need to be deleted, and further, it is not necessary for human operator to check each write that took place.

Additionally, commands from the application server 110 can be captured by the logging mechanism. For example, a "format" command that is allowed to be issued from the application server 110 is registered in the command table 104 as illustrated by the entry 203 in FIG. 2. When a "format" command is received by the storage controller 102, the command is stored on the journal volume 106, and after that, in response to read commands, the storage controller 102 returns zero filled blocks as a data field of the return message. When the storage controller 102 receives writes commands onto the volume that was "formatted" (i.e., virtual volume 108), the data is actually stored in the journal volume 106.

Network Attached Storage

Figure 10A:
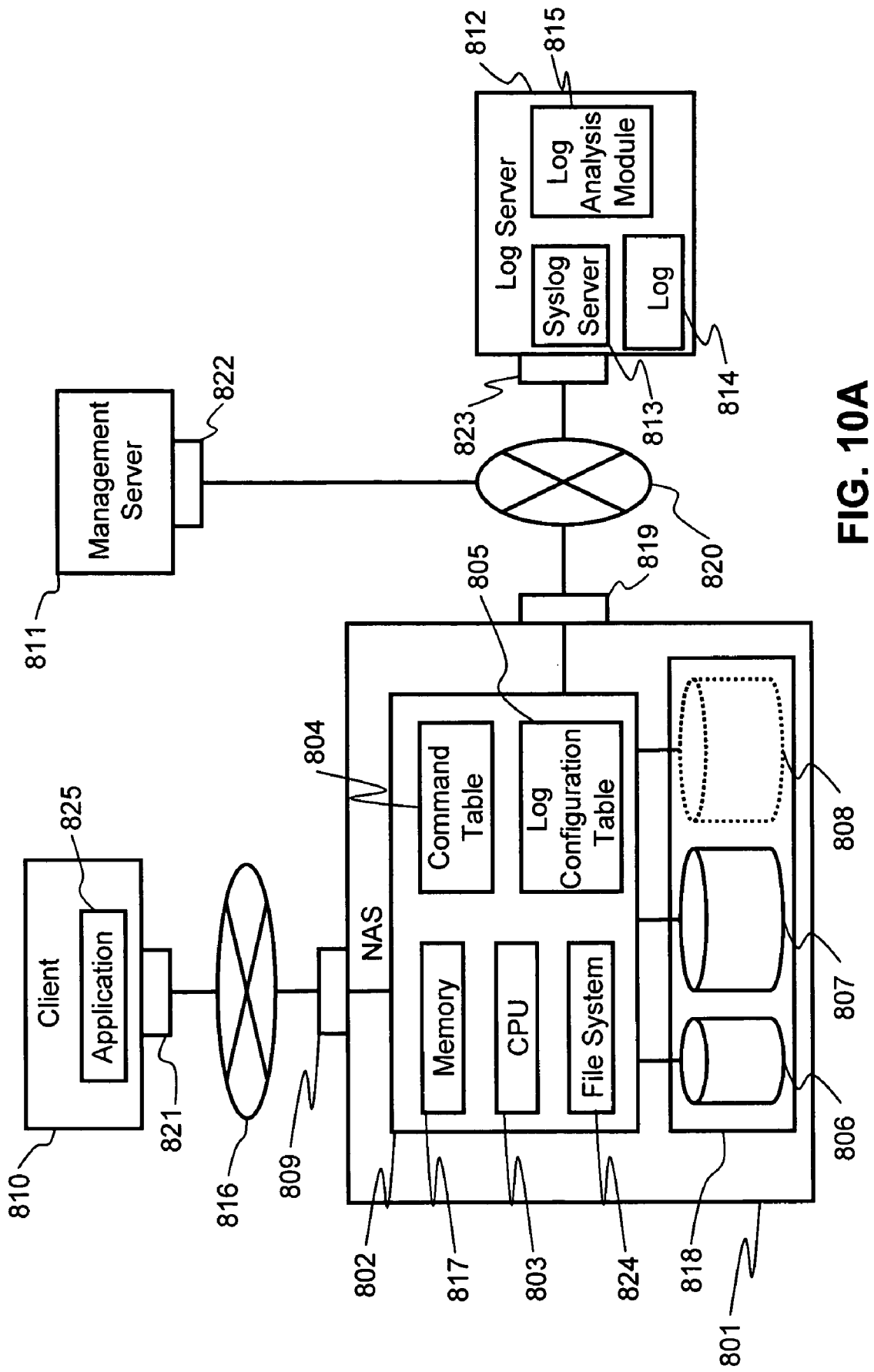
FIG. 10A illustrates a first example in which the invention is applied to a network attached storage (NAS) system.

In the above description, examples for block based storage systems are explained. However the invention can also be applicable to network attached storage (NAS), as discussed bellow. FIG. 10A illustrates an example of the invention applied to a system in which NAS is used. A NAS client 810 having a network interface 821 is able to access files on a NAS server 801 via a network 816 and the NAS server's network interface 809. NAS server 801 includes a NAS head 802 and storage devices 818. NAS head 802 includes a memory 817, a CPU 803, a command table 804 and a log configuration table 805. NAS head 802 further includes a file system 824 managing a file system data structure. A virtual volume 808 is presented to the client 810 as storing the file system data structure, while the actual data is stored on data volume 807 and journal volume 806.

Figure 10B:
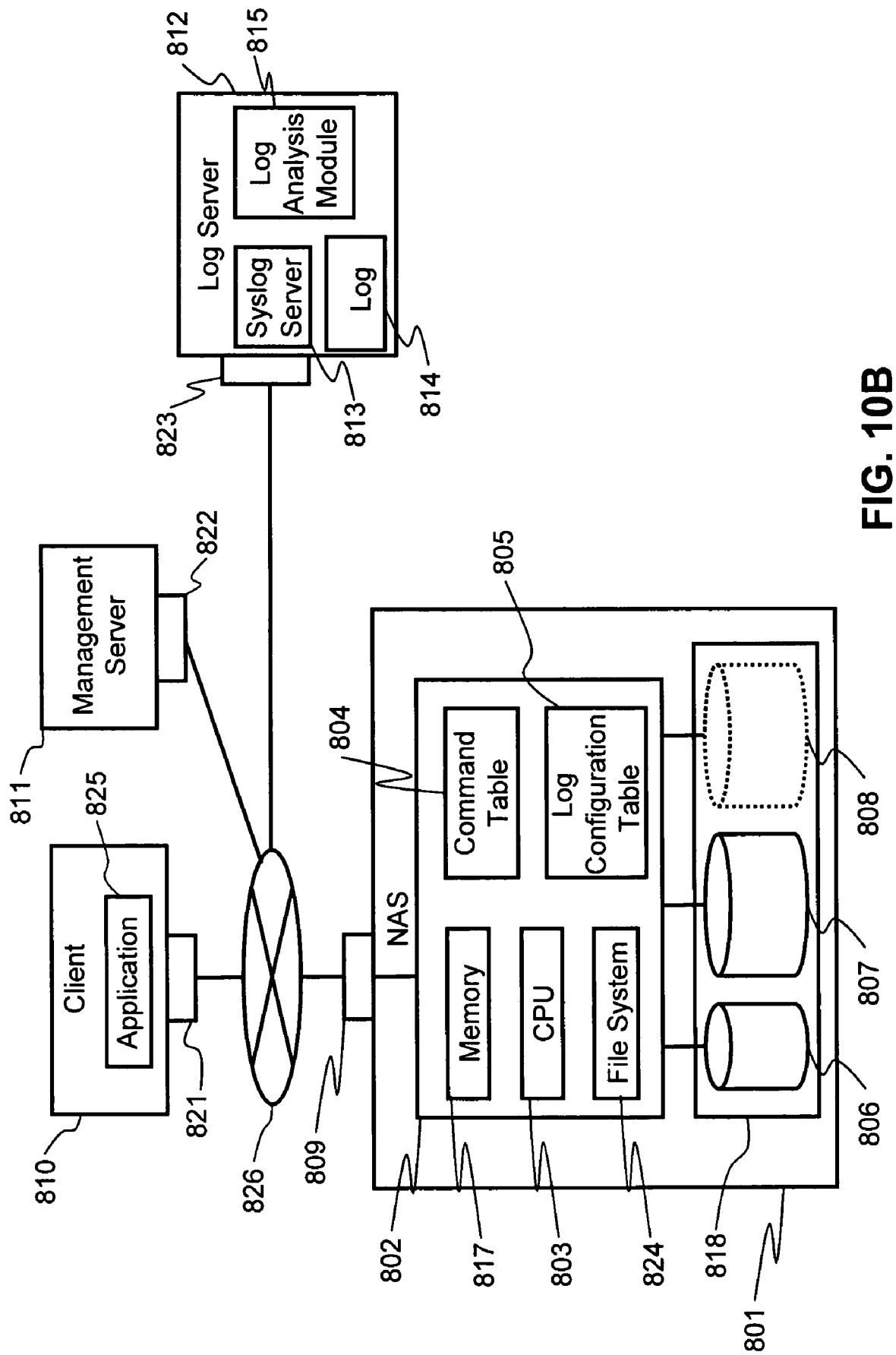
FIG. 10B illustrates another example in which the invention is applied to a network attached storage (NAS) system.

NAS server 801 further includes a second network interface 819 to enable NAS server 101 to communicate with a second network 820. A management server 811 includes a network interface 822, and is in communication with NAS server 801 via network 820. Management server 811 may be used for carrying out management functions with respect to NAS server 801, and for sending management instructions to NAS server 801. Also in communication with second network 820, via a network interface 823, is a log server 812 running a syslog server 813 to which the NAS server 801 transmits log information, as described above with respect to the embodiments of FIGS. 1 and 6. One or more logs 814 are stored by log server 812, and a log analysis module 815 may also be included for execution by server 812. In an alternative embodiment, as illustrated in FIG. 10B, first network 816 and second network 820 may comprise a single network 826 through which client 810, management server 811, log server 812, and NAS server 801 are all able to communicate.

Figures 11, 12:
FIG. 11 illustrates a command table for use in the NAS system.
FIG. 12 illustrates a possible log entry in the NAS system.

As illustrated in FIG. 11, command table 804, is similar to command table 104 described above, and includes a list of file system commands, as exemplified by rows 901-903, that are required to be logged under the system and method of the invention. For example, a user working on client 810 is able to remotely login to the NAS server 801, and may issue a command, such as "rm-r-f/home/hoge" (i.e., a "remove" command that instructs removal of data). This particular command instructs NAS server 801 to remove all of the files under the directory "/home/hoge". This command is logged in log file 814 as log entry 1002, as illustrated in FIG. 12, since the "rm" command is registered in the command table 804 as a command to be logged, as shown in row 901. The instruction is also entered as an entry in journal volume 806, to be applied at a later time (in the case of an AFTER journal) to data volume 807.

Those commands issued on the file system 824 running on the controller 802 through a mechanism such as remote login are translated to SCSI write commands issued by the controller 802 to the volume 808 and they are written on the virtual volume 808, and actually stored in the journal volume 806.

In an alternative embodiment for any of the embodiments discussed above, all of the commands including write commands can be logged. In such a case, the command tables 104, 804 do not have to be maintained.

In the preferred embodiments described above, the log analysis module 115, 815 analyzes the log entries as they are entered. However, in an alternative embodiment, the log analysis module 115, 815 may periodically analyze the log 114, and if no intrusion or attack is found since the last analysis, the module 115, 815 may issue a command to apply the journal in the journal volume 106, 806 to the data volume 107, 807, so that the process to maintain the virtual volume 108, 808 becomes simpler. Further, if the journal data in volume 106, 806 is not used after the data has been applied to the data volume 107, 807, the already-applied data stored in the journal volume 106, 806 may be discarded.

Inserting Markers into the Journal Volume

Under yet another embodiment, when the storage controller 102 receives a command included in the command table 104, the storage controller 102 may also insert a marker in the journal volume 106 just before the next write operation that is affected by the command. This results in incrementing the sequence number, as well as generating a log entry and sending the log entry to the log server 112. This is related to the markers described in the US Patent Application Publication to Yamagami, 2005/0022213, discussed and incorporated above. The marker may contain command information, such as target volume name, timestamp, and the like. Thus, the log entry generated for the command may contain the sequence number of the marker, rather than the sequence number of a subsequent write operation. The markers may further contain information which is used to distinguish between normal write operations and markers. The markers also may contain information which is used to help identify the event, such as the name of the command. However, when the data in the journal volume 106 is applied to the data volume 107, the data on the record of the marker is not written on the data volume. For example, the address space in the journal entry may be a null value. Also when the application server 110 reads the volume 108, the records of the marker are not used to construct the virtual view of the volume 108. When markers are inserted in the journal volume, analysis for malicious attacks may be performed using the journal volume without the having to examine the logs generated by the storage controller 102. In order for the log analysis module 115 to analyze the data, the journal volume 106 may be exposed to the log analysis module 115 and the log analysis module 115 can read the data, or, alternatively, the data in the journal volume 106 may be imported on the storage of the log server 112 for analysis.

Thus, it may be seen that the invention provides a storage system with a means for protecting data and for recovering data should a malicious attack or other data corruption be detected. Further, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A method of storing data in a storage system comprising:
providing a storage system having a first volume and a second volume;
receiving a command by said storage system, said command targeting said first volume;

receiving a write data targeting said first volume following completion of processing said command;

assigning a sequence number to said write data;

sending a log entry with a description of the command and the sequence number to a first computer in communication with said storage system; and storing the write data in the second volume with said sequence number.

2. The method of claim 1, further including the step of receiving an instruction at said storage system from said first computer upon said first computer reaching a determination, following analysis of the log entry, that data recovery will not be necessary, said instruction instructing the storage system to apply said write data to said first volume.

3. The method of claim 1, further including the step of receiving an instruction at said storage system from said first computer upon said first computer reaching a determination, following analysis of the log entry, that data recovery will be necessary, said instruction instructing the storage system to delete said write data, and all subsequently-received write data from said second volume.

4. The method of claim 1, further including the step of analyzing at the first computer the log entry received from the storage system to determine whether said command is malicious or otherwise necessitates data recovery.

5. The method of claim 1, further including the step of storing the write data and all subsequently-received write data sequentially in said second volume until, from analyzing of said log entry, a determination is made as to whether said command will necessitate data recovery; and receiving an instruction from said first computer by said storage system instructing said storage system to apply said write data to said first volume following said determination when said command does not necessitate data recovery, or delete said write data when said command does necessitate data recovery.

6. The method of claim 1, further including the step of comparing said command with a list of commands required to be logged, such that said storage system determines whether to create the log entry.

7. The method of claim 1, further including the step of providing a syslog server on said first computer for receiving said log entry from said storage system and for storing said log entry into a log file.

8. The method of claim 2, further including the step of prior to applying said write data to said first volume, copying any preexisting data that will be overwritten or deleted as a result of the command to a third volume in said storage system.

9. A data protection system comprising:

a storage system having a controller and one or more storage devices, with a first volume and a second volume being allocated on said one or more storage devices;

said storage system being in communication with a first computer via a first network;

said storage system being in communication with a second computer via the first network or via a second network;

said first computer being configured to send a command to said storage system to be applied to said first volume;

said storage system being configured to receive the command and send a log entry containing information of the command and a sequence number designated to the command to the second computer;

said second computer being configured to store the log entry and analyze the log entry to determine whether data recovery will be necessary when the command has been applied to the first volume.

10. The data protection system of claim 9, said storage system further being configured to store write data received after said command as a journal entry having the sequence number assigned thereto in said second volume until said second computer instructs said storage system to apply said write data to the first volume.

11. The data protection system of claim 9, said storage system further being configured to copy preexisting data on said first volume to be overwritten by said write data to said second volume and stored as a journal entry with the sequence number, and then store said write data to said first volume.

12. The data protection system of claim 9, said storage system further including a third volume, said storage system further being configured to store said write data as a journal entry in said second volume with the sequence number assigned thereto until said second computer instructs said storage system to apply said write data to the first volume;

said storage system further being configured to copy data in said first volume that will be overwritten by said write data to said third volume with the sequence number and then apply said write data to said first volume after said second computer determines that data recovery will not be necessary due to the command being applied to the first volume.

13. The data protection system of claim 9, further including a syslog server on said second computer for receiving said log entry from said storage system and for storing said log entry into a log file.

14. The data protection system of claim 9, wherein said storage system includes a list of commands required to be logged, said storage system being configured to compare said command with said list for determining whether to create the log entry.

15. A method of protecting data in a storage system having a storage controller and one or more storage devices, with a first journal volume and a data volume being allocated on said one or more storage devices, said storage system being in communication with a first computer via a first network, said storage system being in communication with a second computer via either the first network or a second network, the method comprising;

receiving a command by said storage system from said first computer, said command targeted to be applied to said data volume;

receiving write data targeting said data volume and assigning a sequence number to said write data;

sending a log entry containing information regarding the command and the sequence number assigned to the write data to the second computer;

storing said write data as a journal entry in the first journal volume with the sequence number.

16. The method of claim 15, further including the step of receiving an instruction at said storage system from said second computer upon said second computer reaching a determination, following analysis of the log entry, that data recovery will not be necessary, said instruction instructing the storage system that applying said write data to said data volume is allowable.

17. The method of claim 15, further including the step of receiving an instruction by said storage system from said second computer upon said second computer reaching a determination, following analysis of the log entry, that data recovery will be necessary, said instruction instructing the storage system to delete said write data, and any subsequently-received write data from said first journal volume.

18. The method of claim 15, further including the step of storing all subsequently-received write data sequentially as journal entries in said journal volume until, from an analysis of said log entry, a determination is made as to whether said command will necessitate data recovery; and receiving an instruction from said second computer to said storage system instructing said storage system that applying said write data to said first volume is allowable following said determination when said command does not necessitate data recovery, or deletion of said write data is required when said command necessitates data recovery.

19. The method of claim 15, further including the step of comparing said command with a list of commands required to be logged, such that said storage system determines whether to create the log entry.

20. The method of claim 16, further including the step of prior to applying said command and said write data to said data volume, copying any preexisting data that will be overwritten or deleted as a result of the write data to a second journal volume in said storage system.

* * * * *